US012718115B2

(12) United States Patent
Harinen et al.

(10) Patent No.: US 12,718,115 B2
(45) Date of Patent: Aug. 25, 2026

(54) SYSTEM AND METHOD FOR CALCULATING GENERALIZED UTILITIES AND CHOICE PREDICTIONS

(71) Applicant: TOYOTA RESEARCH INSTITUTE, INC., Los Altos, CA (US)

(72) Inventors: Totte Harri Harinen, Sunnyvale, CA (US); Rumen Iliev, Milbrae, CA (US); Shabnam Hakimi, San Francisco, CA (US); Alexandre Leo Stephen Filipowicz, Mountain View, CA (US); Emily Sarah Sumner, Mountain View, CA (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 784 days.

(21) Appl. No.: 17/825,648

(22) Filed: May 26, 2022

(65) Prior Publication Data

US 2023/0115661 A1 Apr. 13, 2023

Related U.S. Application Data

(60) Provisional application No. 63/255,369, filed on Oct. 13, 2021.

(51) Int. Cl.
*G06N 5/022* (2023.01)

(52) U.S. Cl.
CPC .................................... *G06N 5/022* (2013.01)

(58) Field of Classification Search
CPC ...................................................... G06N 5/022
See application file for complete search history.

(56) References Cited

U.S. PATENT DOCUMENTS 7,904,439 B2 * 3/2011 Horvitz .............. G06Q 30/0256 707/706
11,075,011 B2 7/2021 Sanghvi et al.
(Continued)

FOREIGN PATENT DOCUMENTS

WO 2021004725 A1 1/2021

OTHER PUBLICATIONS

Sirui et al ("The Effect of Temporal Distance and Social Distance on Consumer Choice: A Discrete Choice Experimental Approach", University of Guelph, Dec. 2009, pp. 1-82).*
(Continued)

*Primary Examiner* — Jennifer N Welch
*Assistant Examiner* — Quoc Ly Phu Phung
(74) *Attorney, Agent, or Firm* — SEYFARTH SHAW LLP

(57) ABSTRACT

A method for calculating generalized utilities and choice predictions is described. The method includes identifying an individual's choice a user desires to predict and relevant parameters influencing the individual's choice. The method also includes manually selecting between different function forms and parameter estimates for an expected generalized utility (EGU) model if a choice data is unavailable. The method further includes providing a machine learning (ML)-based recommendation for the function forms and parameter estimates if the choice data is available. The method also includes displaying a predicted choice as well as a confidence interval associated with the predicted choice estimated using the EGU model.

12 Claims, 5 Drawing Sheets

(56) References Cited

U.S. PATENT DOCUMENTS

| | | | | |
|---|---|---|---|---|
| 11,087,200 | B2 | 8/2021 | Olson et al. | |
| 11,093,834 | B2 | 8/2021 | Ahern et al. | |
| 11,101,038 | B2 | 8/2021 | Szeto | |
| 11,101,043 | B2 | 8/2021 | Krishnan et al. | |
| 11,113,704 | B2 | 9/2021 | Towriss | |
| 11,114,204 | B1 | 9/2021 | Guttag et al. | |
| 2012/0226640 | A1* | 9/2012 | Chen | G06N 7/01 706/12 |
| 2019/0251463 | A1 | 8/2019 | Lopez et al. | |
| 2019/0251477 | A1* | 8/2019 | Crosta | G06Q 50/20 |
| 2019/0384828 | A1* | 12/2019 | Bangalore Narayanamurthy | G06F 16/2453 |
| 2020/0175635 | A1* | 6/2020 | Ke | G06Q 30/0613 |
| 2020/0265195 | A1* | 8/2020 | Galitsky | G06F 40/253 |
| 2020/0334694 | A1* | 10/2020 | Dagley | G06N 20/20 |
| 2021/0390401 | A1* | 12/2021 | Brooks | G06Q 30/0202 |
| 2022/0029424 | A1* | 1/2022 | Burra | G05B 19/042 |
| 2022/0276563 | A1* | 9/2022 | Wang | G03F 1/36 |
| 2023/0064026 | A1* | 3/2023 | Dimou | H04L 5/0055 |
| 2023/0080851 | A1* | 3/2023 | Zoldi | G06N 3/045 706/15 |
| 2023/0148382 | A1* | 5/2023 | Schnellbächer | A61B 8/5223 600/408 |

OTHER PUBLICATIONS

David et al ("The Predictive Utility of Generalized Expected Utility Theories", The Econometric Society, Nov. 1994, pp. 1251-1289).*

Wergieluk, Julian, "Probabilistic predictions: Embracing the uncertainty for better decision-making", (https://medium.com/towards-data-science/probabilistic-predictions-fe04214bde48), Jun. 19, 2020.

Maifeld-Carucci, Illiana, "Calibration and predictive uncertainty", (https://www.datamachines.io/blog/calibration-and-predictive-uncertainty), Jun. 5, 2019.

* cited by examiner

SYSTEM AND METHOD FOR CALCULATING GENERALIZED UTILITIES AND CHOICE PREDICTIONS

CROSS-REFERENCE TO RELATED APPLICATION

Field

The present application claims the benefit of U.S. Provisional Patent Application No. 63/255,369, filed Oct. 13, 2021, and titled "SOCIAL EXPECTED UTILITY: INDIFFERENCE TO OTHERS CAN INFLUENCE RISK PREFERENCES," the disclosure of which is expressly incorporated by reference herein in its entirety.

BACKGROUND

Field

Certain aspects of the present disclosure generally relate to machine learning and, more particularly, to a system and method for calculating generalized utilities and choice predictions.

Background

Individuals make choices for various reasons. Sometimes, these choices are associated with non-negligible compromises for the decision maker. Conversely, some individuals make certain choices with high confidence, as these choices have negligible or no associated compromises for the individual making the decision. These individuals may solely focus on how they are impacted by their choices. Nevertheless, virtually all choices individuals make affect other people. The effect on other people caused by an individual's choices may have both positive and negative outcomes, which may or may not be perceived when the individual makes a choice.

Predicting human choices is important for many domains, including election forecasting, market analytics, public policy support, insurance markets, and medical choices. Most of the work on predicting choices has been focused on choices under uncertainty, which is referred to as "decision under uncertainty." While the social component of decision making is well-studied, a social dimension has not yet been incorporated into existing quantitative models of choice under uncertainty.

SUMMARY

A method for calculating generalized utilities and choice predictions is described. The method includes identifying an individual's choice a user desires to predict and relevant parameters influencing the individual's choice. The method also includes manually selecting between different function forms and parameter estimates for an expected generalized utility (EGU) model if a choice data is unavailable. The method further includes providing a machine learning (ML)-based recommendation for the function forms and parameter estimates if the choice data is available. The method also includes displaying a predicted choice as well as a confidence interval associated with the predicted choice estimated using the EGU model.

A non-transitory computer-readable medium having program code recorded thereon for calculating generalized utilities and choice predictions is described. The program code is executed by a processor. The non-transitory computer-readable medium includes program code to identify an individual's choice a user desires to predict and relevant parameters influencing the individual's choice. The non-transitory computer-readable medium also includes program code to manually select between different function forms and parameter estimates for an expected generalized utility (EGU) model if a choice data is unavailable. The non-transitory computer-readable medium further includes program code to providing a machine learning (ML)-based recommendation for the function forms and parameter estimates if the choice data is available. The non-transitory computer-readable medium also includes program code to display a predicted choice as well as a confidence interval associated with the predicted choice estimated using the EGU model.

A system for calculating generalized utilities and choice predictions is described. The system includes a choice identification module to identify an individual's choice a user desires to predict and relevant parameters influencing the individual's choice. The system also includes a manual EGU parameter/function module to manually select between different function forms and parameter estimates for an expected generalized utility (EGU) model if a choice data is unavailable. The system further includes an estimated EGU parameter/function model to providing a machine learning (ML)-based recommendation for the function forms and parameter estimates if the choice data is available. The system also includes an EGU prediction model to display a predicted choice as well as a confidence interval associated with the predicted choice estimated.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
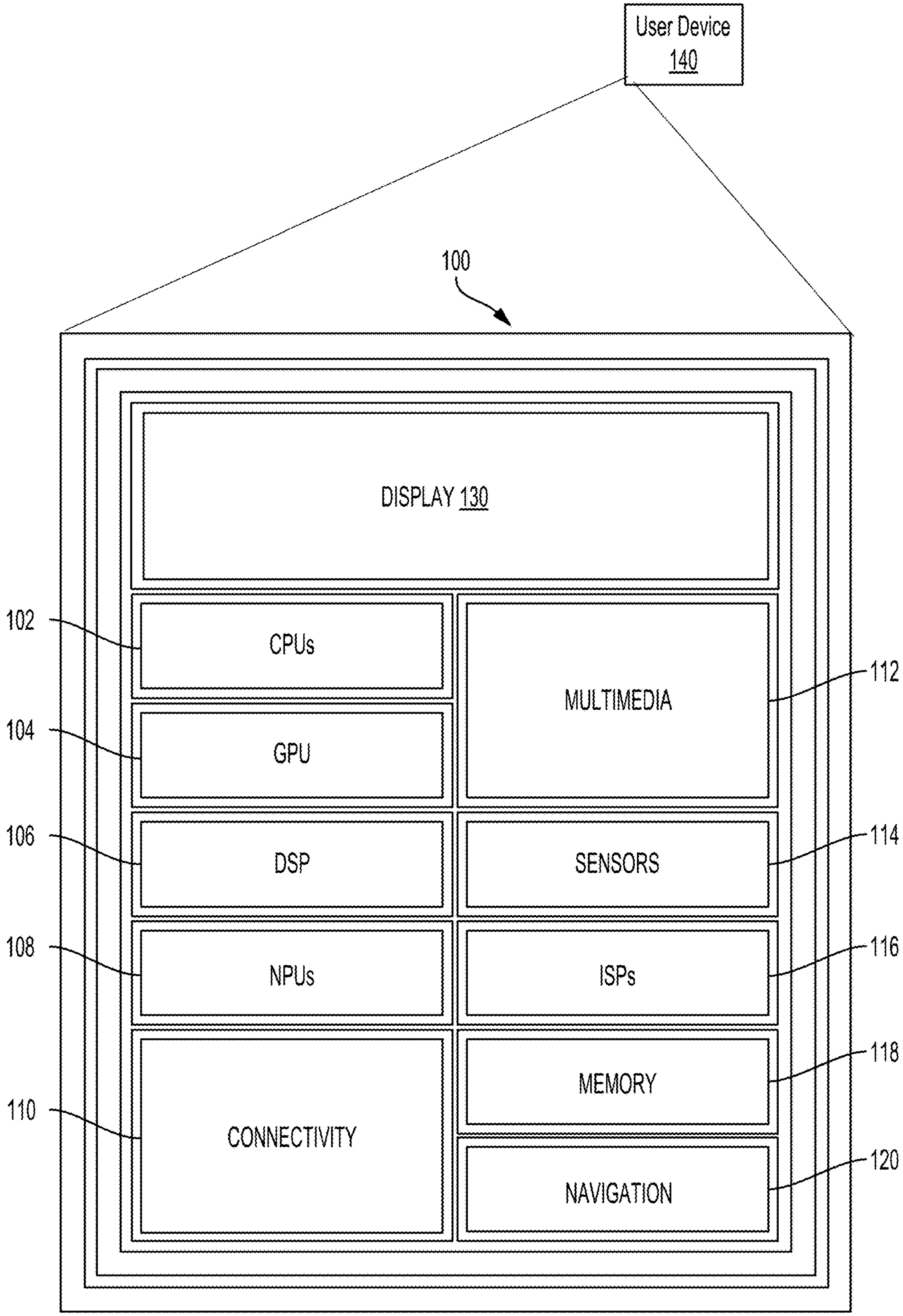
FIG. 1 illustrates an example implementation of designing a neural network using a system-on-a-chip (SOC) for expected generalized utility (EGU) calculation and choice prediction, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks, and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Individuals make choices for various reasons. Sometimes, these choices are associated with non-negligible compromises for the decision maker. Conversely, some individuals make certain choices with high confidence, as these choices have negligible or no associated compromises for the individual making the decision. These individuals may solely focus on how they are impacted by their choices. Nevertheless, virtually all choices individuals make affect other people. The effect on other people caused by an individual's choices may have both positive and negative outcomes, which may or may not be perceived when the individual makes a choice.

In fact, virtually all of the decisions individuals make impact those around them. For example, when parents buy a home, the local school district impacts their children's education. When a professor plans a course, the material impacts students' potential career choices. When a congresswoman supports a certain bill, it impacts the lives of her constituents. Predicting these human choices is important for many domains, including election forecasting, market analytics, public policy support, insurance markets, and medical choices.

Most of the work on predicting choices has focused on choices under uncertainty, and currently this is a relatively well understood area. For example, people are risk seeking in the domain of losses and risk averse in the domain of gains. Therefore, it is straightforward to build predictive models of human choices based on knowing the outcomes of the options and the particular measures of risk. Currently, predictive software systems of how people will choose between different insurance options, medical treatments or between lottery tickets are easily built. This line of work is broadly known as "decision under uncertainty" and is mainly based on Expected Utility models and their derivations (e.g., Prospect Theory).

In particular, while the social component of how choices are made is an increasingly popular topic, the social component of how choices are made is not incorporated into existing choice models. Yet, adding a social component can lead to more generalizable and more accurate choice models. Indeed, previous research shows that the processes used to make choices for others can deviate from how individuals make choices for themselves. When choosing between gains, people are risk averse, preferring choices that have a higher probability of success over choices with a lower probability of success (even if these low probability choices lead to higher average payouts). Nevertheless, this risk aversion differs when individuals make choices that can affect others. For example, when choosing between potential gains, people make risky choices when making choices for others than when making choices for themselves. When choices lead to a loss (as opposed to a gain), the individual's choices were less conclusive. Several theoretical explanations of this shift in risk preferences have been proposed, but they have not been directly linked to existing quantitative models of choice under uncertainty.

While being able to predict choices under uncertainty is extremely valuable, it covers just a small part of the choices that people make. Choice options are commonly high dimensional, and individuals must account for factors other than uncertainty when making decisions. Some aspects of the present disclosure are based on a novel generalized utility framework that simultaneously accounts for four dimensions of choice options: outcomes, uncertainty, temporal distance, and social distance. A generalized framework allows prediction of not only how people choose between static options, but also between options in which the outcomes differ in time, and about options in which recipients could be different from themselves. These aspects of the present disclosure are directed to a mathematical model that simultaneously accounts for all four dimensions of choice options: outcomes, uncertainty, temporal distance, and social distance.

FIG. 1 illustrates an example implementation of the aforementioned system and method for expected generalized utility (EGU) calculation and choice prediction using a system-on-a-chip (SOC) 100, according to aspects of the present disclosure. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, select a control action, according to the display 130 illustrating a view of a user device.

In some aspects, the NPU 108 may be implemented in the CPU 102, DSP 106, and/or GPU 104. The SOC 100 may further include sensors 114, image signal processors (ISPs) 116, and/or navigation 120, which may, for instance, include a global positioning system. The SOC 100 may be based on an Advanced Risk Machine (ARM) instruction set or the like. In another aspect of the present disclosure, the SOC 100 may be a server computer in communication with a user device 140. In this arrangement, the user device 140 may include a processor and other features of the SOC 100.

In this aspect of the present disclosure, instructions loaded into a processor (e.g., CPU 102) or the NPU 108 of the user device 140 may include code to calculate generalized utilities and choice predictions. The instructions loaded into a processor (e.g., NPU 108) may also include code to identify an individual's choice a user desires to predict and relevant parameters influencing the individual's choice. The instructions loaded into a processor (e.g., NPU 108) may also include code to manually select between different function forms and parameter estimates for an expected generalized utility (EGU) model if a choice data is unavailable. The instructions loaded into a processor (e.g., NPU 108) may also include code to provide a machine learning (ML)-based recommendation for the function forms and the parameter estimates of the EGU model if the choice data is available. The instructions loaded into a processor (e.g., NPU 108) may also include code to display a predicted choice, as well as a confidence interval associated with the predicted choice estimated using the EGU model.

Figure 2:
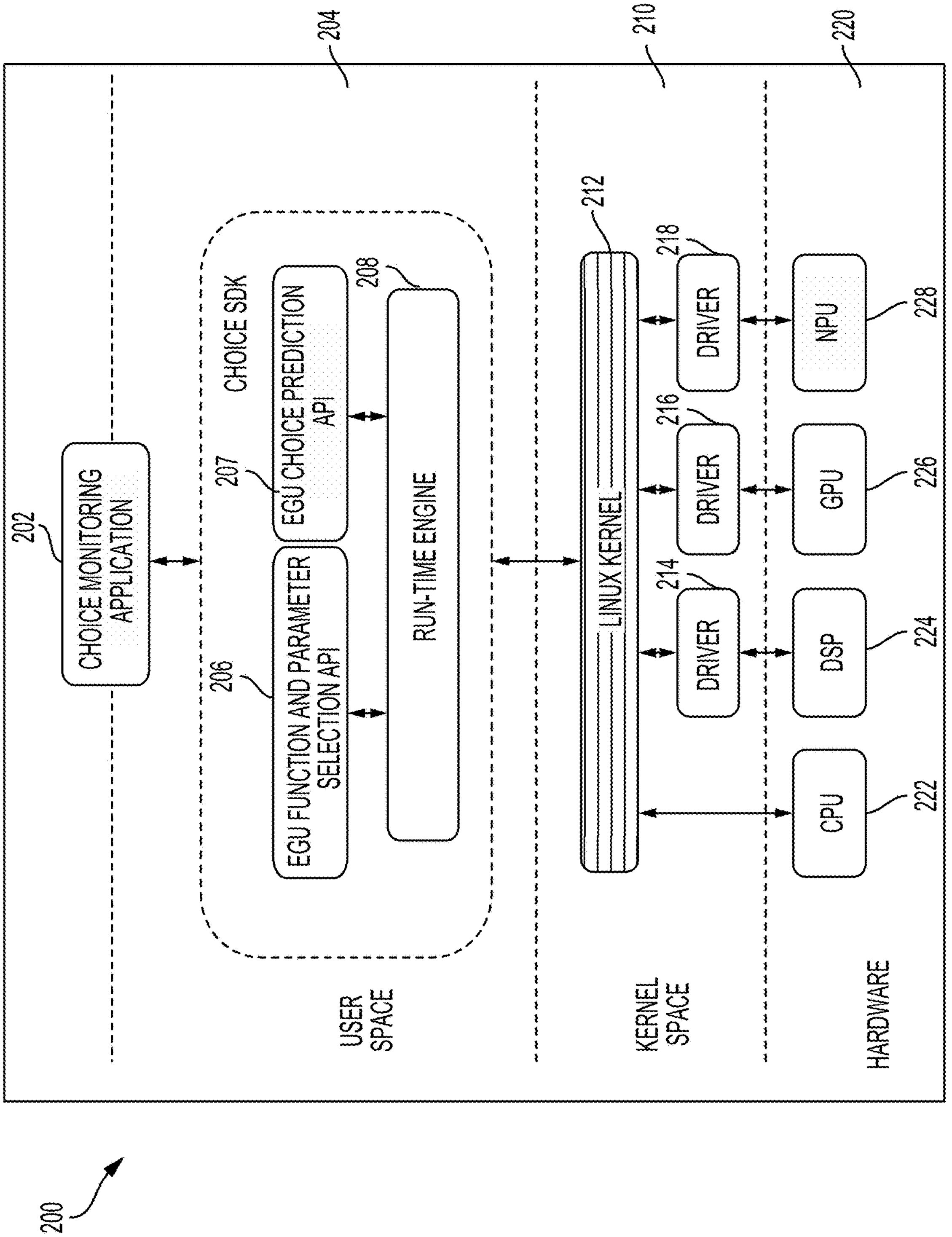
FIG. 2 is a block diagram illustrating an exemplary software architecture that may modularize artificial intelligence (AI) functions for an expected generalized utility (EGU) choice prediction system, according to aspects of the present disclosure.

FIG. 2 is a block diagram illustrating a software architecture 200 that may modularize artificial intelligence (AI) functions for an expected generalized utility (EGU) choice prediction system, according to aspects of the present disclosure. Using the architecture, a choice monitoring application 202 may be designed such that it may cause various processing blocks of an SOC 220 (for example a CPU 222, a DSP 224, a GPU 226, and/or an NPU 228) to perform supporting computations during run-time operation of the choice monitoring application 202. FIG. 2 describes the software architecture 200 for EGU calculation and choice prediction, it should be recognized that the EGU calculation and choice prediction is not limited to decisions involving gain. According to aspects of the present disclosure, the EGU calculation and choice prediction functionality is applicable to any type of decision or individual activity.

The choice monitoring application 202 may be configured to call functions defined in a user space 204 that may, for example, provide for EGU calculation and choice prediction services. The choice monitoring application 202 may make a request for compiled program code associated with a library defined in an EGU function and parameter selection application programming interface (API) 206. The EGU function and parameter selection API 206 is configured to enable manually selecting or machine learning (prediction) of different function forms and parameter estimates for an EGU model. In some aspects of the present disclosure, the EGU model takes four inputs: x is an outcome of a particular choice; p is the probability associated with this outcome; r is the recipient of the outcome; t is the time in which the outcome is received. In response, compiled code of an EGU choice prediction API 207 is configured to display a predicted choice, as well as a confidence interval associated with the predicted choice estimated using the EGU model.

A run-time engine 208, which may be compiled code of a run-time framework, may be further accessible to the choice monitoring application 202. The choice monitoring application 202 may cause the run-time engine 208, for example, to take actions for predicting an individual's choice using an EGU model. In response to the EGU model receiving four inputs (x is an outcome of a particular choice; p is the probability associated with this outcome; r is the recipient of the outcome; t is the time in which the outcome is received), the run-time engine 208 may in turn send a signal to an operating system 210, such as a Linux Kernel 212, running on the SOC 220. FIG. 2 illustrates the Linux Kernel 212 as software architecture for EGU calculation and prediction of an individual's choice. It should be recognized, however, that aspects of the present disclosure are not limited to this exemplary software architecture. For example, other kernels may provide the software architecture to support the EGU calculation and choice prediction functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Individuals make choices for various reasons. In particular, these individuals may solely focus on how they are impacted by their choices. Nevertheless, virtually all choices individuals make affect other people. The effect on other people caused by an individual's choices may have both positive and negative outcomes, which may or may not be perceived when the individual makes a choice. Predicting human choices is important for many domains, including election forecasting, market analytics, public policy support, insurance markets, and medical choices. Existing research in the field of predicting choices focuses on choices under uncertainty.

While being able to predict choices under uncertainty is extremely valuable, it covers just a small part of the choices that people make. Choice options are commonly high dimensional, and individuals must account for factors other than uncertainty when making decisions. Some aspects of the present disclosure are based on a novel generalized utility framework that simultaneously accounts for four dimensions of choice options: outcomes, uncertainty, temporal distance, and social distance. A generalized framework allows prediction of not only how people choose between static options, but also between options in which the outcomes differ in time, and about options in which recipients could be different from themselves. These aspects of the present disclosure are directed to a mathematical model that simultaneously accounts for all four dimensions of choice options: outcomes, uncertainty, temporal distance, and social distance.

Figure 3:
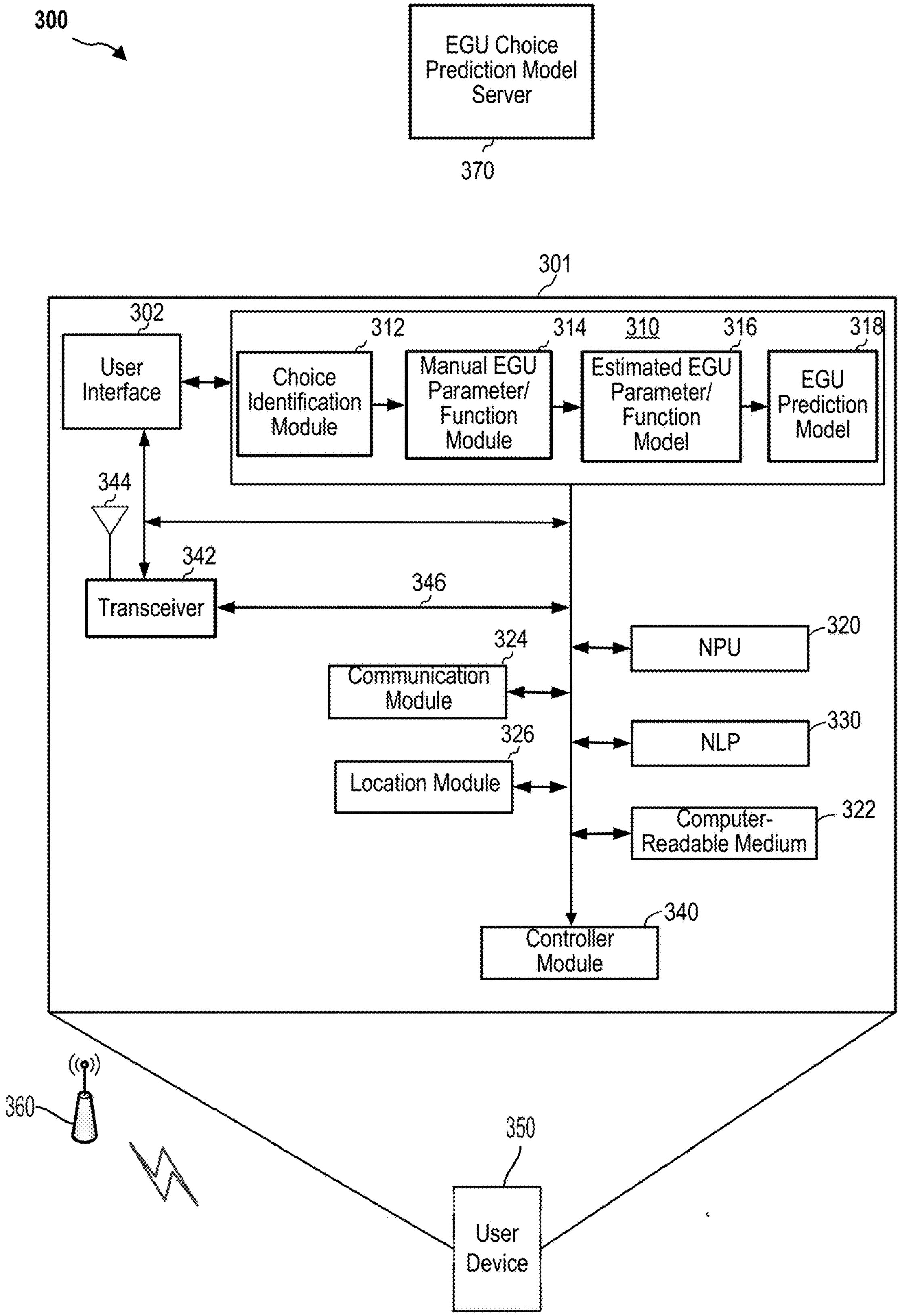
FIG. 3 is a diagram illustrating a hardware implementation for an expected generalized utility (EGU) choice prediction system, according to aspects of the present disclosure.

FIG. 3 is a diagram illustrating a hardware implementation for an expected generalized utility (EGU) choice prediction system 300, according to aspects of the present disclosure. The EGU choice prediction system 300 may be configured to identify an individual's choice that a user desires to predict and relevant parameters influencing the individual's choice. The EGU choice prediction system 300 may also be configured to manually select between different function forms and parameter estimates for an expected generalized utility (EGU) model if a choice data is unavailable. The EGU choice prediction system 300 may be configured to provide a machine learning (ML)-based recommendation for the function forms and the parameter estimates of the EGU model if the choice data is available. The EGU choice prediction system 300 may be further configured to display a predicted choice, as well as a confidence interval associated with the predicted choice estimated using the EGU model.

The EGU choice prediction system 300 includes an EGU calculation and choice prediction system 301 and an EGU choice prediction model server 370 in this aspect of the present disclosure. The EGU calculation and choice prediction system 301 may be a component of a user device 350. The user device 350 may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a Smartbook, an Ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a global positioning system device, or any other suitable device that is configured to communicate via a wireless or wired medium.

The EGU choice prediction model server 370 may connect to the user device 350 for providing choice predictions. For example, the EGU choice prediction model server 370 may receive an individual's choice that a user desires to predict and relevant parameters influencing the individual's choice. The EGU choice prediction model server 370 may provide a machine learning (ML)-based recommendation for the function forms and the parameter estimates of the EGU model if the choice data is available. The EGU choice prediction model server 370 may also transmit a predicted choice, as well as a confidence interval associated with the predicted choice estimated using an EGU model that is displayed by the user device 350.

The EGU calculation and choice prediction system 301 may be implemented with an interconnected architecture, represented generally by an interconnect 346. The interconnect 346 may include any number of point-to-point interconnects, buses, and/or bridges depending on the specific application of the EGU calculation and choice prediction system 301 and the overall design constraints. The interconnect 346 links together various circuits including one or more processors and/or hardware modules, represented by a user interface 302, a choice prediction module 310, a neutral network processor (NPU) 320, a computer-readable medium 322, a communication module 324, a location module 326, a natural language processor (NLP) 330, and a controller module 340. The interconnect 346 may also link various other circuits such as timing sources, peripherals, voltage regulators, and power management circuits, which are well known in the art, and, therefore, will not be described any further.

The EGU calculation and choice prediction system 301 includes a transceiver 342 coupled to the user interface 302, the choice prediction module 310, the NPU 320, the computer-readable medium 322, the communication module 324, the location module 326, the NLP 330, and the controller module 340. The transceiver 342 is coupled to an antenna 344. The transceiver 342 communicates with various other devices over a transmission medium. For example, the transceiver 342 may receive commands via transmissions from another user or a connected device. In this example, the transceiver 342 may receive/transmit information for the choice prediction module 310 to/from connected devices within the vicinity of the user device 350.

The EGU calculation and choice prediction system 301 includes the NPU 320 coupled to the computer-readable medium 322. The NPU 320 performs processing, including the execution of software stored on the computer-readable medium 322 to provide a neural network model for user monitoring and advice recommendation functionality according to the present disclosure. The software, when executed by the NPU 320, causes the EGU calculation and choice prediction system 301 to perform the various functions described for expected generalized utility (EGU) calculation and choice prediction through the user device 350, or any of the modules (e.g., 310, 324, 326, 330, and/or 340). The computer-readable medium 322 may also be used for storing data that is manipulated by the NLP 330 when executing the software to analyze user communications.

The location module 326 may determine a location of the user device 350. For example, the location module 326 may use a global positioning system (GPS) to determine the location of the user device 350. The location module 326 may implement a dedicated short-range communication (DSRC)-compliant GPS unit. A DSRC-compliant GPS unit includes hardware and software to make the autonomous vehicle 350 and/or the location module 326 compliant with the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 342. For example, the communication module 324 may be configured to provide communication capabilities via different wireless protocols, such as 5G new radio (NR), Wi-Fi, long term evolution (LTE), 4G, 3G, etc. The communication module 324 may also communicate with other components of the user device 350 that are not modules of the EGU calculation and choice prediction system 301. The transceiver 342 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

The EGU calculation and choice prediction system 301 also includes the NLP 330 to receive and analyze language from a data log of choice communications to determine choice data regarding EGU parameters and functions. In some aspects of the present disclosure, natural language processing of the NLP 330 is applied to a data log for extracting terms from an individual's choices, regarding, for example, the effects of social distance and personal distance on the individual's choices. In aspects of the present disclosure, the NLP 330 is used if the communications are conducted in plain text. The EGU calculation and choice prediction system 301, however, may receive and analyze the data log to determine the individual's concerns around various choices, such as compromises, risk, and costs. In these aspects of the present disclosure, the communications are a sequence of interaction logs (e.g., iterative searching process, selected filters, questionnaires). These aspects of the present disclosure analyze non-language communications (e.g., those mentioned above) using machine learning models to suggest EGU parameters and functions.

The choice prediction module 310 may be in communication with the user interface 302, the NPU 320, the computer-readable medium 322, the communication module 324, the location module 326, the NLP 330, the controller module 340, and the transceiver 342. In one configuration, the choice prediction module 310 monitors communications from the user interface 302. The user interface 302 may monitor user communications to and from the communication module 324. According to aspects of the present disclosure, the NLP 330 may use natural language processing to extract terms from communications regarding predicted choices. For example, the extract terms may include terms revealing the effects of social distance and personal distance on an individual's predicted choices, as well as relevant parameters influencing the individual's predicted choices.

As shown in FIG. 3, the choice prediction module 310 includes a choice identification module 312, a manual EGU parameter/function module 314, an estimated EGU parameter/function model 316, and an EGU prediction model 318. The estimated EGU parameter/function model 316 and the EGU prediction model 318 may be components of a same or different artificial neural network, such as a deep convolutional neural network (CNN). The estimated EGU parameter/function model 316 and the EGU prediction model 318 are not limited to a CNN. The choice prediction module 310 is configured to enable calculation of utilities for predicting an individual's choice as a function of uncertainty, social distance, and personal distance, according to aspects of the present disclosure.

This configuration of the choice prediction module 310 includes the choice identification module 312 for identifying an individual's choice a user desires to predict and relevant parameters influencing the individual's choice. The choice prediction module 310 also includes the manual EGU parameter/function module 314 for manually selecting between different function forms and parameter estimates for an expected generalized utility (EGU) model if a choice data is unavailable. The choice prediction module 310 also includes the estimated EGU parameter/function model 316 to provide a machine learning (ML)-based recommendation for the function forms and parameter estimates if the choice data is available. The choice prediction module 310 further includes the EGU prediction model 318 to display a predicted choice, as well as a confidence interval associated with the predicted choice estimated using the EGU model through the user interface 302.

As noted above, existing research in the field of predicting choices focuses on choices under uncertainty. While being able to predict choices under uncertainty is extremely valuable, it covers just a small portion of the choices that people make. Choice options are commonly high dimensional, and individuals must account for factors other than uncertainty when making decisions. Some aspects of the present disclosure are based on a novel generalized utility framework that simultaneously accounts for four dimensions of choice options: outcomes, uncertainty, temporal distance, and social distance. A generalized framework allows prediction of not only how people choose between static options, but also between options in which the outcomes differ in time, and about options in which recipients could be different from themselves. These aspects of the present disclosure are directed to a mathematical model that simultaneously accounts for all four dimensions of choice options: outcomes, uncertainty, temporal distance, and social distance.

In some aspects of the present disclosure, the EGU prediction model 318, is configured as a multi-dimensional predictive software system that predicts an outcome for an individual's choice. In some configurations, the EGU prediction model 318 takes multiple factors into account using a novel generalized utility framework including four dimensions of choice options: (1) outcomes, (2) uncertainty, (3) temporal distance and (4) social distance, for example, as shown in FIG. 4.

Figure 4:
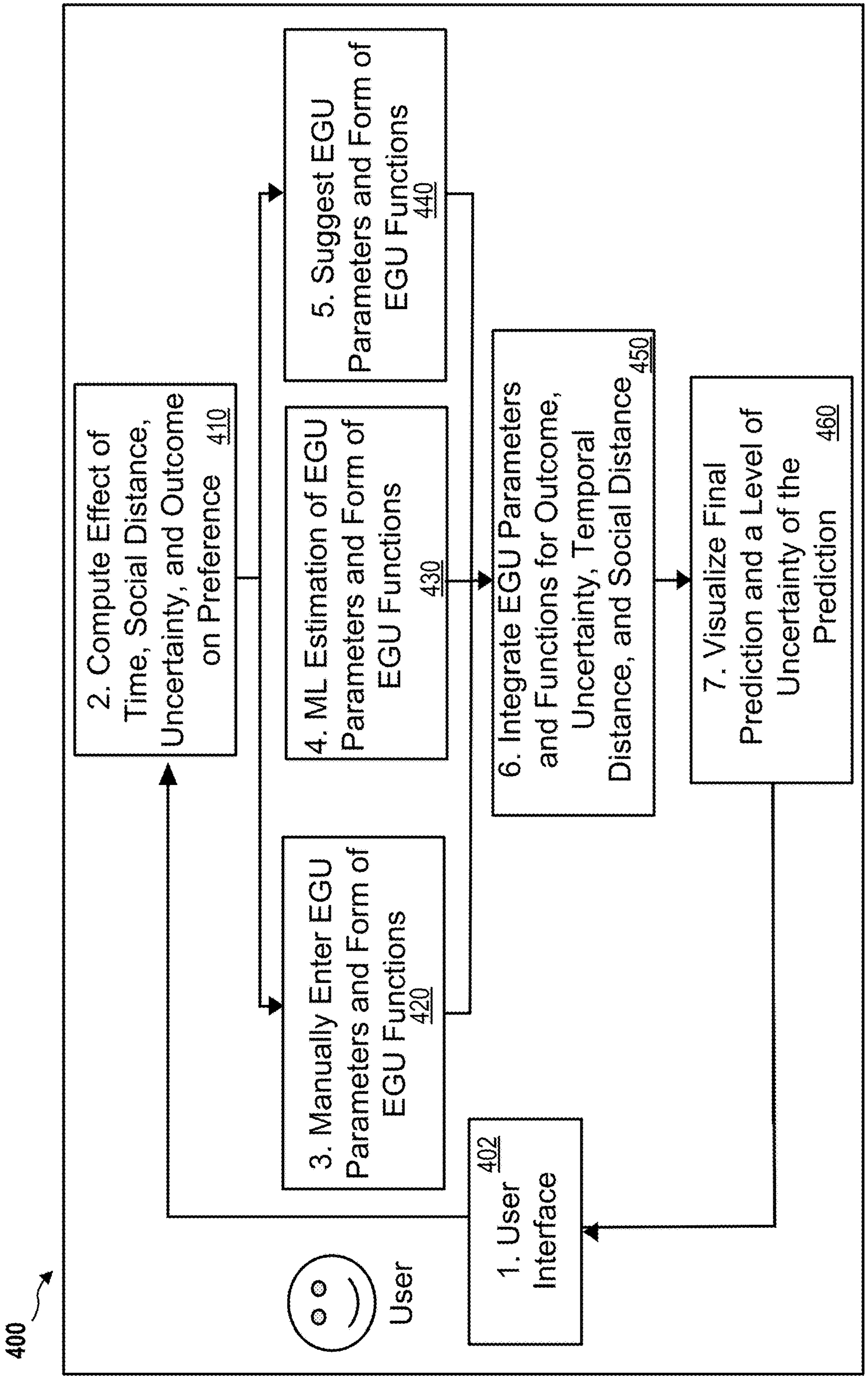
FIG. 4 is a block diagram illustrating a generalized utility calculation and choice prediction system, in accordance with aspects of the present disclosure.

FIG. 4 is a block diagram illustrating a generalized utility calculation and choice prediction system 400, in accordance with aspects of the present disclosure. In this example, the generalized utility calculation and choice prediction system 400 includes a user interface 402 that enables a user to identify an individual's choice that they desire to predict. The user may provide relevant parameters that might influence the individual's choice through the user interface 402. In response, the generalized utility calculation and choice prediction system 400 employs a function to predict the outcome. For example, a marketing researcher might use the tool to predict a customer preference when buying a car; an educational researcher might try to predict what kind of advice prospective students will receive from their parents; or a medical expert might try to predict a patient choice between different medical treatments.

As an example, consider current predictive software which can answer questions such as "Will user X choose insurance policy A or insurance policy B?" Using our generalized model, our predictive software will be able to answer more complex questions, such as:

Person X prefers car A, when choosing between cars A and B. What is the probability that they will choose the same car if they are not choosing for themselves but for someone else instead?

Person Y prefers car A, when choosing between cars A and B. What is the probability that they will choose the same car if they will start using the car further in the future?

Person Z is considering a donation to charity. What is the amount of money they will donate if the donation is for a cause in their own city or for a cause in a different city?

Some aspects of the present disclosure are directed to a generalized utility model that is designed to allow calculations of utilities for predicting individual's choices as a function of uncertainty, social distance, and personal distance. In one aspect of the present disclosure, a mathematical model takes four inputs: x is an outcome of the particular alternative; p is a probability associated with the outcome; r is a recipient of the outcome; t is a time in which the outcome is received. The following equations, including the probability of selecting option A from the set of options A and B, illustrate how these variables are used to predict the choice of the user. For example, a general form of a mathematical model of expected generalized utility (EGU) is:

$$EGU=w(t)v(r)u(x)g(p), \quad (1)$$

and a probability for choosing option A from the set of options A and B is given by:

$$P(A\backslash\{A,B\})=f(x_1 p_1,x_2,p_2,r_1,r_2,t_1,t_2) \quad (2)$$

In the general case, w, v, u, g, and fare some functions taking continuous inputs, but as an illustration they can be simplified to the following:

$$u(x) = x^a \quad (3)$$

$$g(p) = p \quad (4)$$

$$v(r) = k_0 \text{ if } r == \text{“self”}; k_1 \text{ if } r == \text{“other”} \quad (5)$$

$$w(t) = l_0 \text{ if } t == \text{“now”}; l_1 \text{ if } t == \text{“later”} \quad (6)$$

$$f(x_1, p_1, x_2, p_2, r_1, r_2, t_1, t_2) = \frac{1}{1 + e^{-(EGU_A - EGU_B)}} \quad (7)$$

where the α parameter captures the curvature of the utility function u(x) of Equation (3). Typically, values of α range from 0 and 1, resulting in a concave shape. An example range for K and L is [0 to 1]. For example, the utility weight for outcome for someone who is very distant can be as low as 0, so K1=0, while the weight for self can be 1, so K0=1. In this example, the weight is inversely related to distance to the present and to self) Similarly, weight for current outcome could be L0=1 and weight for something in the far future can be L1=0.

In some aspects of the present disclosure, there are two modes of interacting with the generalized utility calculation and choice prediction system 400. In a manual mode, the user has the option of selecting the form of the functions and the value of the parameters shown in Equations (1) and (2). In the presence of relevant data, the generalized utility calculation and choice prediction system 400 applies machine learning (ML) techniques for estimating the function forms and the parameters. In aspects of the present disclosure where the relevant data is unavailable, the user manually selects between different function forms and parameter estimates shown in Equations (1) and (2) for computing a generalized utility to predict the individual's choice.

In aspects of the present disclosure, data availability is addressed via three main options. According to a first options, data might come from experiments and surveys where people choose between different gambles. According to a second options, data might also come from real world data, where people make decisions about the future (e.g. opening retirement accounts, choosing different lease durations, bidding in auctions with different closing dates) or making decisions about other people (e.g. donations, gifts). In a third option, the parameters can also be estimated in the absence of data, based on expert judgements alone.

In some aspects of the present disclosure, the generalized utility calculation and choice prediction system 400 is shown with various modules for performing generalized utility calculation and choice prediction. In this configuration, the generalized utility calculation and choice prediction system 400 includes a user interface 402, a preference component 410, a manual EGU parameter/function component 420, an ML EGU parameter/function estimation component 430, an EGU parameter/function suggestion component 440, an EGU parameter/function integration component 450, and a choice prediction component 460.

In this aspect of the present disclosure, the preference component 410 may compute the effect of time, social distance, uncertainty, and outcome on preference. For example, choices that are further in the future, or which concern other people rather than themselves might become more or less risk seeking, depending on the value of the other parameters (e.g. difference in outcomes). A concrete example of how risk seeking might change in either direction based on the model including winning the lottery as a person advances in age.

The manual EGU parameter/function component 420 may enable manual entry of parameters into an EGU model and/or selecting the form of functions for the EGU model. For example, EGU parameters in the form of the EGU functions may be selected for the EGU prediction model 318, as shown in FIG. 3. The ML EGU parameter/function estimation component 430 provides a machine learning (ML)-based recommendation for the function forms and parameter estimates if the choice data is available. In some aspects of the present disclosure, if the user does not have expert knowledge for making a selection, the generalized utility calculation and choice prediction system 400 provides a default mode. For example, in default mode, the EGU parameter/function suggestion component 440 suggests generic EGU function forms and common EGU parameter values. In some aspects of the present disclosure, the EGU parameter values are derived from existing literature or from an internal database of previously run analyses using, for example, the NLP 330 of FIG. 3.

In some aspects of the present disclosure, the EGU parameter/function integration component 450 is configured to integrate the four inputs of an EGU mathematical model: x is an outcome of the particular alternative; p is a probability associated with the outcome; r is a recipient of the outcome; t is a time in which the outcome is received. For example, a general form of a mathematical model of an expected generalized utility (EGU) to enable prediction of an individual's choice is shown in Equations (1) and (2). In these aspects of the present disclosure, the choice prediction component 460 is configured to display a predicted choice, as well as a confidence interval associated with the predicted choice estimated using the EGU model, such as the EGU prediction model 318 of FIG. 3.

In some aspects of the present disclosure, the generalized utility calculation and choice prediction system 400 operates according to the follow process. At step 1, a user, through the user interface 402, identifies an individual's choice that they want to predict and the relevant parameters that might be influencing the individual's choice. For example, a marketing researcher might use the generalized utility calculation and choice prediction system 400 to predict customer preferences when buying a car; an educational researcher might try to predict what kind of advice prospective students receive from their parents; or a medical expert might try to predict patient choices between different medical treatments. At step 2, the preference component 410 computes the effect of time, social distance, uncertainty, and outcome on the relevant parameters that might be influencing the individual's choice.

At step 3, if no choice data is available, the user accesses the manual EGU parameter/function component 420 to manually select between different EGU function forms and EGU parameter estimates. Otherwise, in the presence of choice data, at step 4, the ML EGU parameter/function estimation component 430 provides an ML-based recommendation for EGU function forms and EGU parameter values, for example, as shown in Equations (1)-(7). At step 5, if the user does not have expert knowledge for making a selection, the EGU parameter/function suggestion component 440 suggests generic EGU function forms and common EGU parameter values. Those EGU parameter values are derived from existing literature or from an internal database of previously run analyses, such as the EGU choice prediction model server 370 of FIG. 3. At step 6, the EGU parameter/function integration component 450 is configured to integrate the four inputs of an EGU mathematical model: outcome; uncertainty associated with the outcome; a social distance associated with the outcome; and a temporal distance associated with the outcome. At step 7, the choice prediction component 460 displays a predicted choice, as well as a confidence interval associated with the predicted choice, for example, as further illustrated by the process of FIG. 5.

Figure 5:
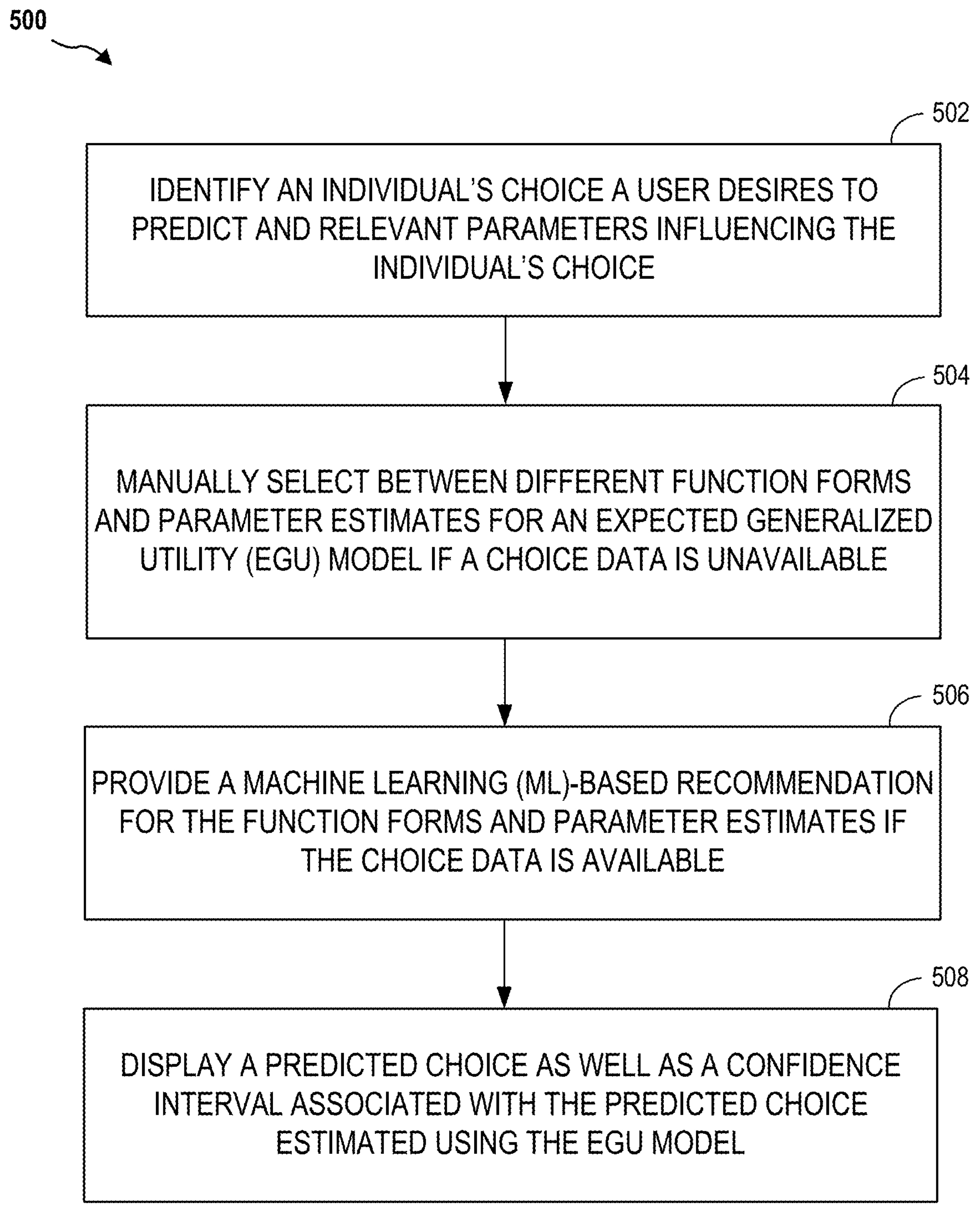
FIG. 5 is a flowchart illustrating a method for calculating generalized utilities and choice predictions, according to aspects of the present disclosure.

FIG. 5 is a flowchart illustrating a method for calculating generalized utilities and choice predictions, according to aspects of the present disclosure. A method 500 of FIG. 5 begins at block 502, in which an individual's choice a user desires to predict and relevant parameters influencing the individual's choice is identified. For example, as described in FIG. 3, the choice prediction module 310 includes the choice identification module 312 for identifying an individual's choice a user desires to predict and relevant parameters influencing the individual's choice. As shown in FIG. 4, at step 1, a user, through the user interface 402, identifies an individual's choice that they want to predict and the relevant parameters that might be influencing the individual's choice.

Referring again to FIG. 5, at block 504, manual selection between different function forms and parameter estimates for an expected generalized utility (EGU) model is performed if a choice data is unavailable. For example, as shown in FIG. 3, the choice prediction module 310 also includes the manual EGU parameter/function module 314 for manually selecting between different function forms and parameter estimates for an expected generalized utility (EGU) model if a choice data is unavailable. As shown in FIG. 4, at step 3, if no choice data is available, the user accesses the manual EGU parameter/function component 420 to manually select between different EGU function forms and EGU parameter estimates, for example, as shown in Equations (1)-(7).

At block 506, a machine learning (ML)-based recommendation is provided for the function forms and parameter estimates if the choice data is available. For example, as shown in FIG. 3, the choice prediction module 310 also includes the estimated EGU parameter/function model 316 to provide a machine learning (ML)-based recommendation for the function forms and parameter estimates if the choice data is available. As shown in FIG. 4, in the presence of choice data, at step 4, the ML EGU parameter/function estimation component 430 provides an ML-based recommendation for EGU function forms and EGU parameter values, for example, as shown in Equations (1)-(7).

At block 508, a predicted choice, as well as a confidence interval associated with the predicted choice estimated using the EGU model are displayed. For example, as shown in FIG. 3, the choice prediction module 310 further includes the EGU prediction model 318 to display a predicted choice as well as a confidence interval associated with the predicted choice estimated through the user interface 302. The EGU prediction model 318, is configured as a multi-dimensional predictive software system that predicts an outcome for an individual's choice. In some configurations, the EGU prediction model 318 takes multiple factors into account using a novel generalized utility framework including four dimensions of choice options: (1) outcomes, (2) uncertainty, (3) temporal distance, and (4) social distance. As shown in FIG. 4, at step 7, the choice prediction component 460 displays a predicted choice as well as a confidence interval associated with the predicted choice.

In the method 500, the relevant parameters may include an uncertainty parameter, a social distance parameter, and a personal distance parameter regarding the predicted choice. In the method 500, the user may include an educational researcher, and the choice comprises predicting a type of advice prospective students receive from their parents. The method 500 also includes suggesting generic function forms and common parameter values for the EGU model if the user does not have expert knowledge to make a selection. The method 500 also includes displaying the predicted choice by calculating, using the EGU model, a utility value as a function of an uncertainty parameter, a social distance parameter, and a personal distance parameter regarding the predicted choice. The method 500 also includes suggesting generic functions by providing a software default mode in which data values are selected from existing literature and/or from an internal database of previously run analyses, for example, as shown in FIGS. 3 and 4.

Choice options are commonly high dimensional, and individuals must account for factors other than uncertainty when making decisions. Some aspects of the present disclosure are based on a novel generalized utility framework that simultaneously accounts for four dimensions of choice options: outcomes, uncertainty, temporal distance, and social distance. A generalized framework allows prediction of not only how people choose between static options, but also between options in which the outcomes differ in time, and about options in which recipients could be different from themselves. These aspects of the present disclosure are directed to a mathematical model that simultaneously accounts for all four dimensions of choice options: outcomes, uncertainty, temporal distance, and social distance.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of a list of" items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an ASIC, a field-programmable gate array signal (FPGA) or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM, flash memory, ROM, programmable read-only memory (PROM), EPROM, EEPROM, registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC with the processor, the bus interface, the user interface, supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for calculating generalized utilities and choice predictions, comprising:

identifying an individual's choice a user desires to predict and relevant parameters influencing the individual's choice;

analyzing, using a natural language processor (NLP), language communications from a data log to determine the effects of social distance and personal distance on the individual's choice;

analyzing, using a machine learning (ML) model, non-language communications from a sequence of interaction logs to determine compromises, risks, and costs on the individual's choice;

providing a machine learning (ML)-based estimation of different function forms and relevant parameters for an expected generalized utility (EGU) model according to an outcome parameter and an uncertainty parameter based on the analyzing of the non-language communications, and a social distance parameter and a temporal distance parameter based on the analyzing of the language communications regarding the individual's choice;

integrating the estimates of the function forms and the relevant parameter estimates to configure the EGU model;

predicting, by the EGU model, the individual's choice as well as a confidence interval associated with the predicted, individual's choice; and displaying, through a user interface, the predicted, individual's choice and the associated confidence interval.

2. The method of claim 1, in which predicting comprises calculating, using the EGU model, a utility value as a function of the outcome parameter, the uncertainty parameter, the social distance parameter, and the temporal distance parameter regarding the predicted choice.

3. The method of claim 1, in which the user comprises a marketing researcher and the choice comprises predicting a customer preference when buying a car.

4. The method of claim 1, in which the user comprises an educational researcher and the choice comprises predicting a type of advice prospective students receive from their parents.

5. The method of claim 1, in which the user comprises a medical expert and the choice comprises predicting a patient choice between different medical treatments.

6. A non-transitory computer-readable medium having program code recorded thereon for calculating generalized utilities and choice predictions, the program code being executed by a processor and comprising:

program code to identify an individual's choice a user desires to predict and relevant parameters influencing the individual's choice;

program code to analyze, using a natural language processor (NLP), language communications from a data log to determine the effects of social distance and personal distance on the individual's choice;

program code to analyze, using a machine learning (ML) model, non-language communications from a sequence of interaction logs to determine compromises, risks, and costs on the individual's choice;

program code to provide a machine learning (ML)-based estimation of different function forms and relevant parameters for an expected generalized utility (EGU) model according to an outcome parameter and an uncertainty parameter based on the analyzing of the non-language communications, and a social distance parameter and a temporal distance parameter based on the analyzing of the language communications regarding the individual's choice;

program code to integrate the estimates of the function forms and the relevant parameter estimates to configure the EGU model;

program code to predict, by the EGU model, the individual's choice as well as a confidence interval associated with the predicted, individual's choice; and program code to display, through a user interface, the predicted, individual's choice and the associated confidence interval.

7. The non-transitory computer-readable medium of claim 6, in which the program code to predict comprises program code to calculate, using the EGU model, a utility value as a function of the outcome parameter, the uncertainty parameter, the social distance parameter, and the temporal distance parameter regarding the predicted choice.

8. The non-transitory computer-readable medium of claim 6, in which the user comprises a marketing researcher and the choice comprises predicting a customer preference when buying a car.

9. The non-transitory computer-readable medium of claim 6, in which the user comprises an educational researcher and the choice comprises predicting a type of advice prospective students receive from their parents.

10. The non-transitory computer-readable medium of claim 6, in which the user comprises a medical expert and the choice comprises predicting a patient choice between different medical treatments.

11. A system for calculating generalized utilities and choice predictions, the system comprising:

a choice identification module to identify an individual's choice a user desires to predict and relevant parameters influencing the individual's choice;

a natural language processor (NLP) language to analyze communications from a data log to determine the effects of social distance and personal distance on the individual's choice;

an estimated EGU parameter/function module to analyze, using a machine learning (ML) model, non-language communications from a sequence of interaction logs to determine compromises, risks, and costs on the individual's choice and to provide a machine learning (ML)-based estimation of different function forms and relevant parameters for an expected generalized utility (EGU) model according to an outcome parameter and an uncertainty parameter based on the analyzing of the non-language communications, and a social distance parameter and a temporal distance parameter based on the analyzing of the language communications regarding the individual's choice;

an EGU parameter/function integration model to integrate the estimates of the function forms and the relevant parameter estimates to configure the EGU model;

the EGU model to predict the individual's choice as well as a confidence interval associated with the predicted, individual's choice; and a user interface to display the predicted, individual's choice and the associated confidence interval.

12. The system of claim 11, in which the EGU model is further to calculate a utility value as a function of the outcome parameter, the uncertainty parameter, the social distance parameter, and the temporal distance parameter regarding the predicted choice.

* * * * *